US010613190B2

(12) United States Patent
Suzuki (10) Patent No.: US 10,613,190 B2
(45) Date of Patent: Apr. 7, 2020

(54) POSITION ESTIMATION SYSTEM AND CENTER (71) Applicant: Toyota Jidosha Kabushiki Kaisha, Toyota-shi Aichi-ken (JP)

(72) Inventor: Koichi Suzuki, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/631,666

(22) Filed: Jun. 23, 2017

(65) Prior Publication Data
US 2018/0003795 A1 Jan. 4, 2018

(30) Foreign Application Priority Data
Jun. 30, 2016 (JP) .................................. 2016-131007

(51) Int. Cl.
H04W 24/00 (2009.01)
G01S 5/02 (2010.01)
G01S 19/48 (2010.01)
G01S 5/00 (2006.01)
(Continued)

(52) U.S. Cl.
CPC .......... *G01S 5/0289* (2013.01); *G01S 5/0036* (2013.01); *G01S 5/0236* (2013.01); *G01S 5/14* (2013.01); *G01S 19/48* (2013.01); *G01S 19/50* (2013.01)

(58) Field of Classification Search
CPC . H04W 4/027; H04W 48/04; H04W 52/0225; H04W 4/023; H04W 4/025; H04W 64/00; H04W 64/003; H04W 72/00; G01S 19/51; G02B 6/06; H04M 15/8033;
(Continued)

(56) References Cited

U.S. PATENT DOCUMENTS 6,314,296 B1 11/2001 Hamada et al.
2010/0318621 A1* 12/2010 Aono .................. H04L 12/5895
709/206
2014/0300513 A1 10/2014 Takahashi
(Continued)

FOREIGN PATENT DOCUMENTS

JP H09252485 A 9/1997
JP 2002-051371 A 2/2002
(Continued)

*Primary Examiner* — Gary LaFontant
(74) *Attorney, Agent, or Firm* — Dinsmore & Shohl LLP (57) ABSTRACT A position estimation system includes a mobile terminal; and a center communicating with the mobile terminal. The mobile terminal includes units to execute GPS positioning and base station positioning, respectively, and transmitters to transmit first and second positional information obtained by the GPS positioning and the base station positioning, respectively, to the center. The center includes a receiver to receive the first and second positional information, a position estimator to determine whether a user of the mobile terminal has boarded a train at a station, based on the second positional information if the mobile terminal has become incapable of executing the GPS positioning around the station, and if having determined that the user has boarded a train, to estimate which train was boarded by the user, based on a moving direction of the mobile terminal calculated from the second positional information.

3 Claims, 6 Drawing Sheets (51) Int. Cl.
*G01S 5/14* (2006.01)
*G01S 19/50* (2010.01)

(58) Field of Classification Search
CPC ......... H04M 2242/30; H04M 2250/52; H04M 3/42348
See application file for complete search history.

(56) References Cited

U.S. PATENT DOCUMENTS

2015/0133152 A1* 5/2015 Edge .................... G01S 5/0236
455/456.1
2017/0006431 A1* 1/2017 Donovan ............ H04L 67/2847

FOREIGN PATENT DOCUMENTS

| | | |
|---|---|---|
| JP | 2006-242578 A | 9/2006 |
| JP | 2009-210473 A | 9/2009 |
| JP | 2013-124987 A | 6/2013 |
| JP | 2013-170901 A | 9/2013 |
| JP | 2013-207573 A | 10/2013 |

\* cited by examiner

POSITION ESTIMATION SYSTEM AND CENTER

CROSS-REFERENCE TO RELATED APPLICATIONS

This application is based upon and claims the benefit of priority of the prior Japanese Priority Application No. 2016-131007 filed on Jun. 30, 2016, the entire contents of which are hereby incorporated by reference.

FIELD

The present disclosure relates to a position estimation system that estimates the position of a mobile terminal.

BACKGROUND

Conventionally, a mobile terminal has been known that executes base station positioning in a situation where a GPS signal cannot be received well, such as indoors and underground (see, for example, Patent document 1).

RELATED-ART DOCUMENTS

Patent Documents

[Patent Document 1] Japanese Unexamined Patent Application Publication No. 2002-51371

There are cases where various services are provided that are based on positional information transmitted from mobile terminals to accumulate movement histories of users so as to provide a service suitable for a movement pattern or the liking of each user using his/her mobile terminal. For example, based on a user's past movement pattern and current positional information of the mobile terminal, a service may be provided that estimates the user's future movement destination to transmit route guidance information to the mobile terminal automatically.

However, positional information by base station positioning has an error (for example, about 2 km) that is considerably greater compared to positional information by GPS positioning, and hence, the precision of an estimated position of the mobile terminal drops greatly. Therefore, for example, if a user carrying the mobile terminal moves in a situation where the mobile terminal cannot receive a GPS signal well, as in a case where the user moves by subway, it may not be possible to accumulate the movement history appropriately during that time.

Thereupon, in view of the above problem, it is an object of an embodiment to provide a position estimation system with which precision of the estimated position of a mobile terminal can be raised when a user of the mobile terminal moves in a situation where the mobile terminal cannot receive a GPS signal well.

SUMMARY

In order to achieve the above object, according to an embodiment, a position estimation system is provided that includes a mobile terminal; and a center configured to communicate with the mobile terminal through a predetermined communication network. The mobile terminal includes a GPS positioning unit configured to execute GPS positioning, a base station positioning unit configured to execute base station positioning, a first transmitter configured to transmit first positional information obtained by the GPS positioning to the center, and a second transmitter configured to transmit second positional information obtained by the base station positioning to the center. The center includes a receiver configured to receive the first positional information and the second positional information transmitted from the mobile terminal, a position estimator configured to determine whether a user of the mobile terminal has boarded a train at a station, based on the second positional information in a case where the mobile terminal has become incapable of executing the GPS positioning in a vicinity of the station, and if having determined that the user has boarded a train at the station, to estimate which train was boarded by the user, based on a moving direction of the mobile terminal calculated from the second positional information.

According to the embodiment, the center for the position estimation system (the position estimator) determines whether a user of the mobile terminal has boarded a train at a station in a case where the mobile terminal has become incapable of executing the GPS positioning in a vicinity of the station, based on the second positional information by the base station positioning. The center can determine whether the user of the mobile terminal has boarded a train at the station, for example, by determining whether the moving speed of the mobile terminal calculated from the history of the second positional information has become greater than or equal to a predetermined value, or whether the distance covered in a direction of the line calculated from the history of the second positional information has become greater than or equal to a predetermined value. Then, if having determined that the user has boarded a train at the station, the center estimates which train was boarded by the user, based on a moving direction of the mobile terminal calculated from the second positional information. Therefore, although the second positional information by the base station positioning itself is of low precision, since the moving direction of the mobile terminal calculated from the second positional information by the base station positioning to a certain degree reflects the actual situation, it is possible to estimate which train was boarded by the user in terms of which line stops at the station and which direction of the line has been taken, based on the moving direction. Therefore, it is possible to raise precision of the estimated position of the mobile terminal in a case where the user of the mobile terminal is moving in a situation where the mobile terminal cannot receive a GPS signal well.

Also, in the embodiment described above, the center may include a storage unit to store timetable information, to estimate which train was boarded by the user, based on the moving direction of the mobile terminal calculated from the second positional information and the timetable information.

According to this embodiment, the center for the position estimation system (the position estimator) estimates which train was boarded by the user, based on the moving direction of the mobile terminal calculated from the second positional information and the timetable information. Therefore, with reference to departure times of trains in the timetable information, it is possible to estimate which train was boarded by the user in terms of the departure time by hours and minutes. Consequently, it is possible to further raise the precision of the estimated position of the mobile terminal when the user is moving in a situation where the mobile terminal cannot receive a GPS signal.

Also, in the embodiment described above, the position estimator may determine whether the user is on board the train boarded by the user, based on the second positional information, to estimate a position of the mobile terminal, based on arrival and departure times at each stop station of the train boarded by the user included in the timetable information, while the mobile terminal continues to be in a state incapable of executing the GPS positioning and the determination continues to be valid with respect to the user being on board the train boarded by the user.

According to this embodiment, the position estimation system estimates a position of the mobile terminal, based on arrival and departure times at each stop station of the train boarded by the user included in the timetable information, while the mobile terminal continues to be in a state incapable of executing the GPS positioning and the determination continues to be valid with respect to the user being on board the train boarded by the user. Therefore, even in a situation where the mobile terminal cannot receive a GPS signal, based on the arrival and departure times at each stop station in the timetable information, it is possible to estimate the position of the mobile terminal at the times with comparatively good precision. Consequently, it is possible to further raise the precision of the estimated position of the mobile terminal when the user is moving in a situation where the mobile terminal cannot receive a GPS signal.

Also, in the embodiment described above, the position estimation system may also be provided such that in a situation where the mobile terminal continues to be in a state incapable of executing the GPS positioning, the position estimator determines whether the user has changed trains at a stop station of the train boarded by the user, based on the second positional information, in a case where the moving direction of the mobile terminal calculated from the second positional information deviates from a moving direction of the train boarded by the user beyond a predetermined criterion in a vicinity of the stop station of the train boarded by the user, and if having determined that the user has changed the trains, estimates the train after the change, based on the moving direction of the mobile terminal calculated from the second positional information.

According to this embodiment, in a situation where the mobile terminal continues to be in a state incapable of executing the GPS positioning, the center for the position estimation system (the position estimator) determines whether the user has changed trains at a stop station, based on the second positional information, in a case where the moving direction of the mobile terminal calculated from the second positional information deviates from a moving direction of the train boarded by the user beyond a predetermined criterion, in a vicinity of the stop station of the train boarded by the user. This is because if the moving direction of the mobile terminal calculated from the second positional information deviates from a moving direction of the train boarded by the user beyond the predetermined criterion in the vicinity of the stop station of the train boarded by the user, there is a likelihood that the user has changed trains at the stop station. Also, as described above, the center can determine whether the user of the mobile terminal has changed trains at the station, for example, by determining whether the moving speed of the mobile terminal calculated from the history of the second positional information has become greater than or equal to a predetermined value, or whether the distance covered in a direction of the line calculated from the history of the second positional information has become greater than or equal to a predetermined value. Then, if having determined that the user has changed trains, the center estimates the train after the change, based on the moving direction of the mobile terminal calculated from the second positional information. Therefore, even if the user boards a train at a stop station after having taken and gotten off a previous train, it is possible to estimate the train after the change in terms of which line stops at the station and which direction of the line has been taken, based on the moving direction of the mobile terminal calculated from the second positional information. Consequently, it is possible to further raise the precision of the estimated position of the mobile terminal when the user is moving in a situation where the mobile terminal cannot receive a GPS signal.

Also, other aspects of the present disclosure are implemented by the center.

According to an embodiment, it is possible to provide a position estimation system with which precision of the estimated position of a mobile terminal can be raised when the user of the mobile terminal moves in a situation where the mobile terminal cannot receive a GPS signal well.

DESCRIPTION OF EMBODIMENTS

In the following, embodiments will be described with reference to the drawings.

Figure 1:
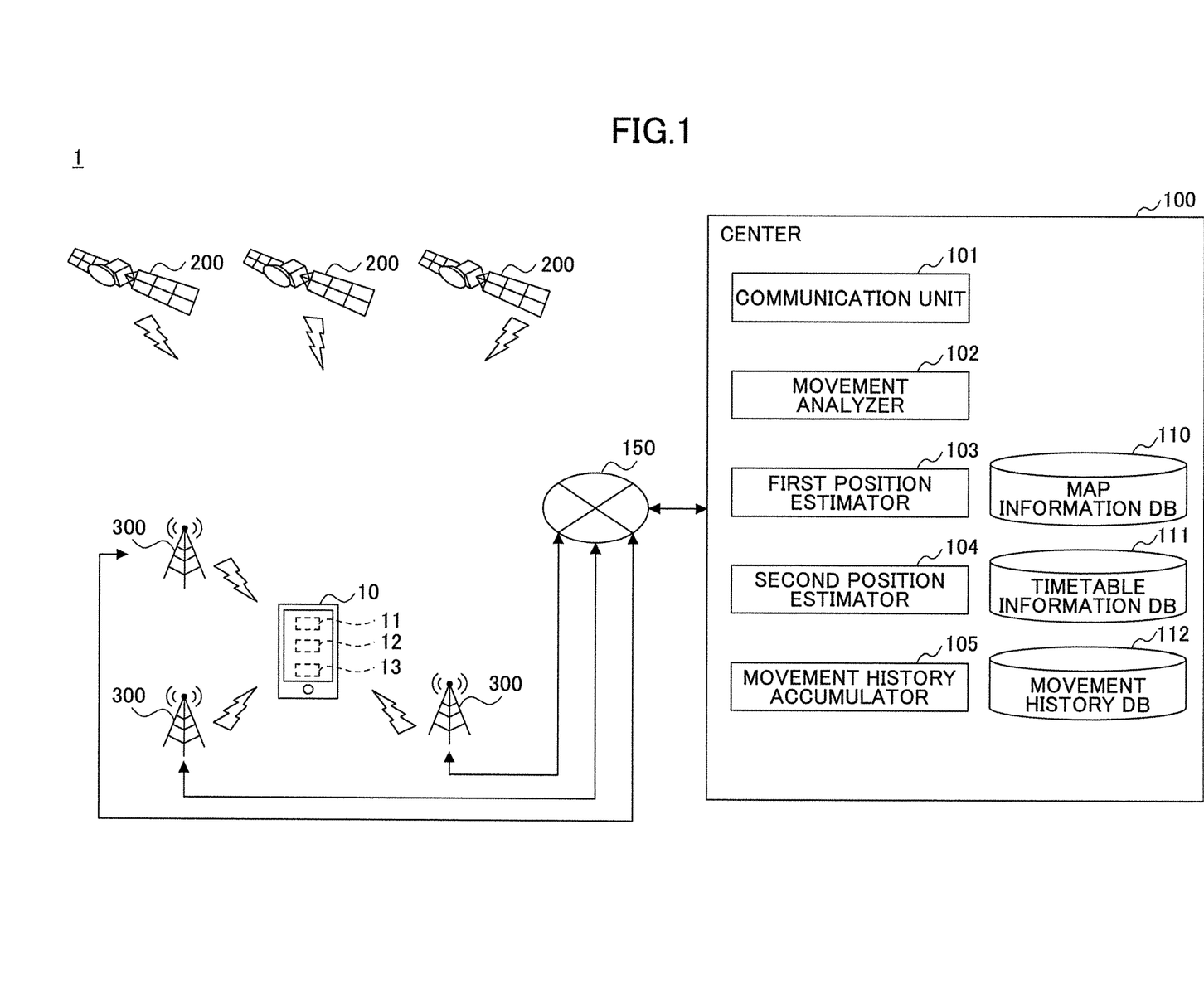
FIG. 1 is a configuration diagram schematically illustrating an example of a configuration of a position estimation system.

FIG. 1 is a configuration diagram schematically illustrating an example of a configuration of a position estimation system 1 according to an embodiment.

The position estimation system 1 includes a mobile terminal 10 and a center 100 to estimate the position of a mobile terminal 10 (namely, the position of the user carrying the mobile terminal 10), based on positional information obtained by positioning functions of the mobile terminal 10 (GPS positioning information and base station positioning information will be described later).

The mobile terminal 10 is, for example, a cellular phone, a smartphone, or a tablet terminal. The mobile terminal 10 can bi-directionally communicate with the center 100 via a predetermined communication network 150 (for example, a cellular phone network or the Internet). The following description assumes that the communication network 150 is constituted by a cellular phone network that has a considerable number of base stations 300 to communicate with terminals.

The mobile terminal 10 also has a GPS (Global Positioning System) function to estimate the position of the mobile terminal 10, based on GPS signals received from GPS satellites 200 orbiting around the earth (the GPS positioning). To implement the GPS function, for example, the mobile terminal 10 has built-in circuits including a receiver circuit to receive a GPS signal distributed from a GPS satellite 200 and to extract time data, and a positioning circuit to execute positioning of the position of the mobile terminal 10 from the time data based on a known method of GPS positioning.

The mobile terminal 10 also executes wireless communication with the base station 300 to estimate the position of the mobile terminal 10 (the base station positioning). To implement wireless communication functions with the base station 300, the mobile terminal 10 has various communication circuits built in.

Note that normally, the GPS positioning can execute positioning of the position of the mobile terminal 10 with higher precision than the base station positioning. However, the GPS positioning cannot be used in an environment where a GPS signal cannot be received well (for example, indoors and underground). In contrast, the base station positioning can be used as long as the mobile terminal 10 is located in a communication area.

The mobile terminal 10 includes a communication unit 11, a GPS positioning unit 12, and a base station positioning unit 13 as illustrated in FIG. 1.

Note that the mobile terminal 10 may include, for example, a CPU and an auxiliary storage unit to implement the functions of the communication unit 11, the GPS positioning unit 12, and the base station positioning unit 13 by running one or more programs stored in the auxiliary storage unit, on the CPU.

The communication unit 11 (an example of a first transmitter and a second transmitter) executes wireless communication with the base station 300 to transmit and receive various signals such as data signals and control signals. In the embodiment, the communication unit 11 transmits the positional information obtained by the GPS positioning executed by the GPS positioning unit 12 (the GPS positioning information), and the positional information obtained by the base station positioning executed by the base station positioning unit 13 (the base station positioning information), to the center 100 through the base station 300. As will be described later, since the mobile terminal 10 is configured to execute one of the GPS positioning and the base station positioning when executing positioning of the mobile terminal 10 periodically, the communication unit 11 periodically transmits positioning information received from one of the GPS positioning unit 12 and the base station positioning unit 13, namely, one of the GPS positioning information and the base station positioning information, to the center 100.

The GPS positioning unit 12 executes the GPS positioning described above. Specifically, the GPS positioning unit 12 executes positioning of the position of the mobile terminal 10 by using a known method of GPS positioning, based on GPS signals received from three or more GPS satellites 200. The GPS positioning unit 12 transmits the GPS positioning information (an example of first positional information), which is positional information obtained by the GPS positioning, to the communication unit 11. If having failed to execute the GPS positioning, namely, if the mobile terminal 10 is incapable of favorably receiving a GPS signal at a given moment, the GPS positioning unit 12 indicates the failure to the base station positioning unit 13.

The base station positioning unit 13 executes the base station positioning described above. Specifically, the base station positioning unit 13 can execute positioning of the position of the mobile terminal 10, based on the strength of a signal received from the base station 300. Also, the base station positioning unit 13 may execute positioning of the position of the mobile terminal 10, based on the receiving strengths of signals received from multiple base stations 300, which can raise the positioning precision.

In the embodiment, the mobile terminal 10 executes positioning periodically, namely, at predetermined time intervals. The positioning starts with the GPS positioning executed by the GPS positioning unit 12. If the GPS positioning has succeeded, the GPS positioning information is transmitted to the center 100 through the communication unit 11. On the other hand, if the GPS positioning has failed, the base station positioning unit 13 executes the base station positioning, and the base station positioning information is transmitted to the center 100 through the communication unit 11.

Note that the base station positioning unit 13 may overlappingly execute the base station positioning even if the GPS positioning unit 12 has succeeded in the GPS positioning. In this case, the communication unit 11 may transmit both the GPS positioning information and the base station positioning information to the center 100.

The center 100 may be placed at a location remote from the mobile terminal 10 in an aspect where bi-directional communication can be executed with the mobile terminal 10 through the communication network 150. The center 100 is mainly constituted with one or more servers, for example.

The center 100 includes, as illustrated in FIG. 1, a communication unit 101, a movement analyzer 102, a first position estimator 103, a second position estimator 104, a movement history accumulator 105, a map information DB 110, a timetable information DB 111, and a movement history DB 112.

The communication unit 101 establishes a wired connection or a wireless connection with the communication networks 150, to transmit and receive various signals with the mobile terminal 10. In the embodiment, the communication unit 101 receives positioning information, namely, the GPS positioning information and the base station positioning information, from the mobile terminal 10. Also, depending on which one of the GPS positioning information and the base station positioning information has been received, the communication unit 101 determines whether the periodical positioning on the mobile terminal 10 is based on the GPS positioning or the base station positioning. The communication unit 101 indicates the determination result to the movement analyzer 102.

Note that the determination function may be implemented by the movement analyzer 102.

The movement analyzer 102 analyzes a movement situation of the user who uses the mobile terminal 10, based on the position of the mobile terminal 10 estimated by the first position estimator 103 and the second position estimator 104, to generate movement history information of the mobile terminal 10. The movement analyzer 102 may identify a movement path, for example, based on the history of the position of the mobile terminal 10 estimated by the first position estimator 103 and the second position estimator 104, and refers to map information in the map information DB 110 to associate the estimated position with a POI (Point Of Interest) such as a facility.

Also, the movement analyzer 102 allocates a position estimation process to one of the first position estimator 103 and the second position estimator 104, based on an indication of the determination result received from the communication unit 101. Specifically, the movement analyzer 102 makes the first position estimator 103 execute the position estimation process if the determination result is "GPS positioning", or makes the second position estimator 104 execute the position estimation process if the determination result is "base station positioning". A specific processing flow will be described later (see FIG. 5).

As described above, the first position estimator 103 estimates the position of the mobile terminal 10, based on the GPS positioning information received by the communication unit 101 if the determination result by the communication unit 101 is "GPS positioning", namely, if the mobile terminal 10 can execute the GPS positioning. As described above, the GPS positioning information indicates the position of the mobile terminal 10 with comparatively higher precision although the estimation still includes an error (for example, about several m to several dozen m). Therefore, the first position estimator 103 may estimate the position of the mobile terminal 10 included in the GPS positioning information (for example, the longitude and latitude) as the position of the mobile terminal 10, as is. Further, the first position estimator 103 may correct the position of the mobile terminal 10 included in the GPS positioning information by using map information stored in the map information DB 110 and a known correction algorithm, to estimate the corrected position as the position of the mobile terminal 10. The first position estimator 103 transmits the information (for example, the longitude and latitude) related to the estimated position of the mobile terminal 10 (referred to as the "first estimated position", below) to the movement analyzer 102.

As described above, the second position estimator 104 estimates the position of the mobile terminal 10, based on the base station positioning information received by the communication unit 101 if the determination result by the communication unit 101 is "base station positioning", namely, if the mobile terminal 10 is incapable of executing the GPS positioning. As described above, since the base station positioning information includes a comparatively greater error (for example, about several hundred m to several km), the second position estimator 104 corrects the position of the mobile terminal 10 included in the base station positioning information by using various correction algorithms, and transmits the information (for example, the longitude and latitude) related to the corrected position of the mobile terminal 10 (referred to as the "second estimated position", below) to the movement analyzer 102. In particular, in the embodiment, the second position estimator 104 estimates whether the user carrying the mobile terminal 10 is on board a train such as a subway or the like, and estimates a specific train boarded by the user, so as to track a movement of the mobile terminal 10 (and the carrying user) by subway or the like that travels in an environment where a GPS signal cannot be received well (movement-by-train estimation function). When executing the movement-by-train estimation function, the second position estimator 104 refers to the map information stored in the map information DB 110 and timetable information of various lines stored in the timetable information DB 111. The movement-by-train estimation function by the second position estimator 104 will be described in detail later (see FIG. 2 to FIG. 4 and FIG. 6).

The movement history accumulator 105 saves the movement history information of the mobile terminal 10 generated by the movement analyzer 102 into the movement history DB 112. Specifically, the movement history accumulator 105 updates the movement history information of the mobile terminal 10 stored in the movement history DB 112 in an aspect where an item of movement history information newly generated by the movement analyzer 102 is added to the movement history information of the mobile terminal 10 stored in the movement history DB 112.

Next, with reference to FIG. 2 to FIG. 4, a summary of the movement-by-train estimation function by the second position estimator 104 will be described.

Figure 2:
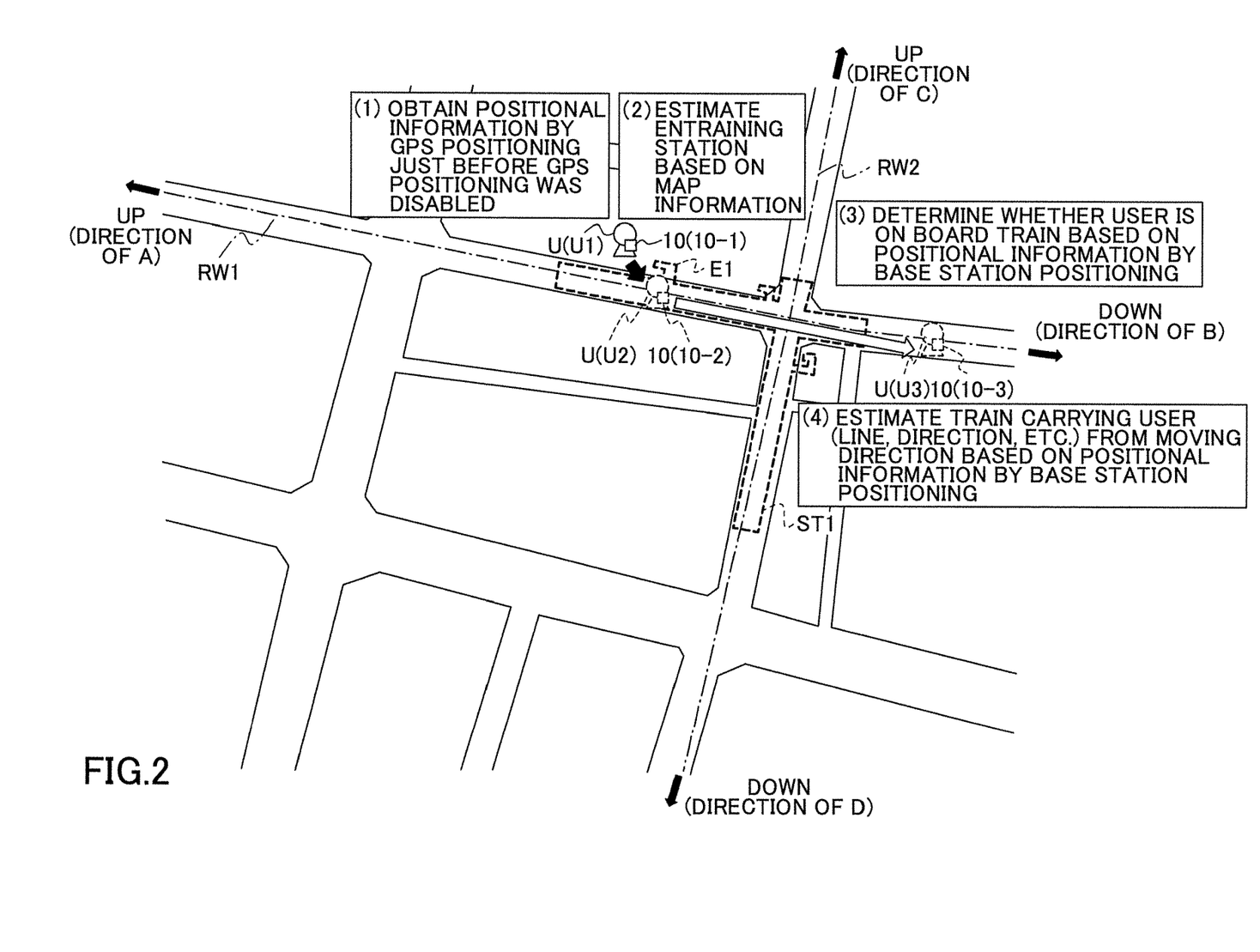
FIG. 2 is a diagram illustrating operations of a position estimation system.
Figure 3:
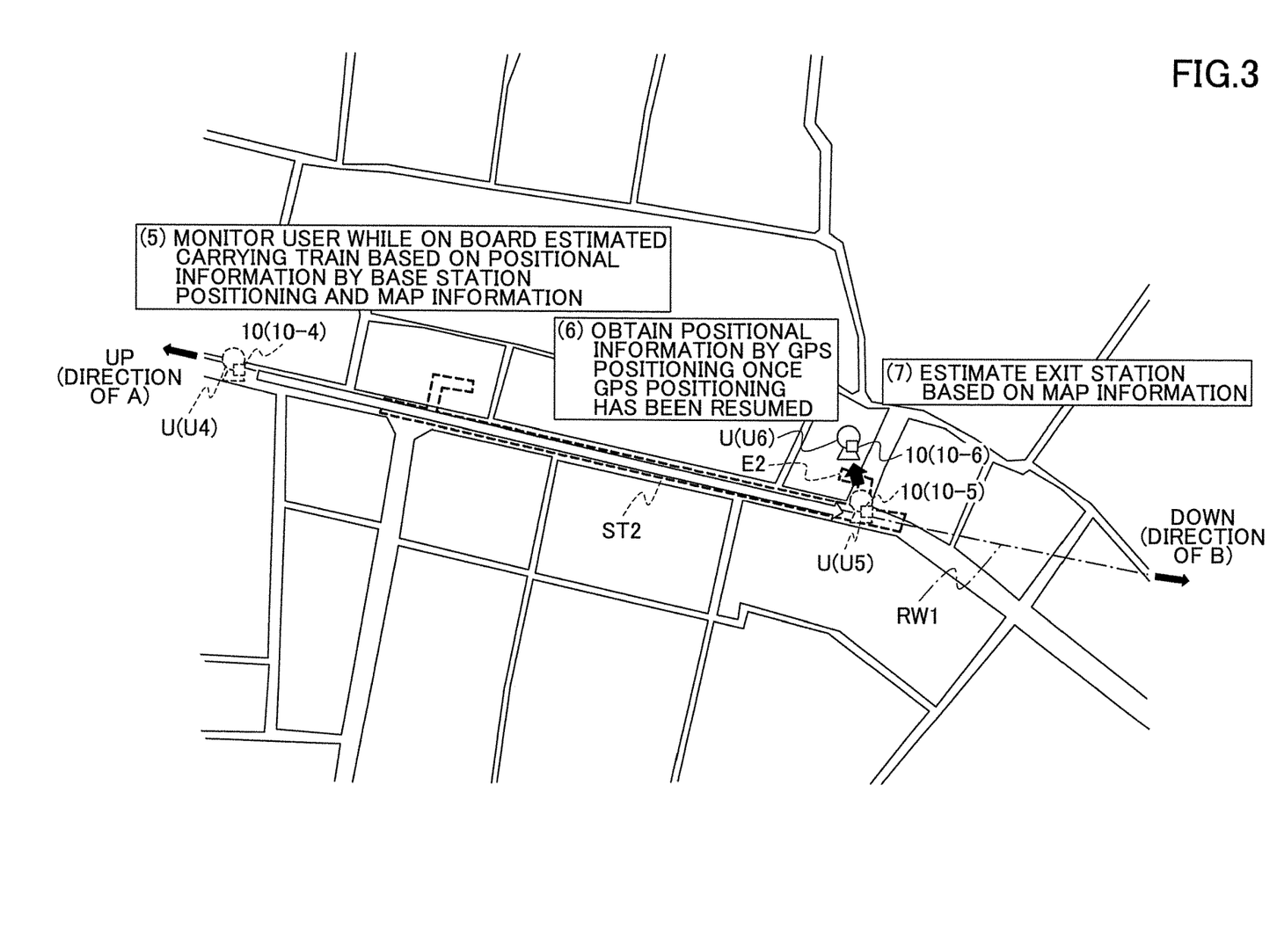
FIG. 3 is a diagram illustrating operations of a position estimation system.
Figure 4:
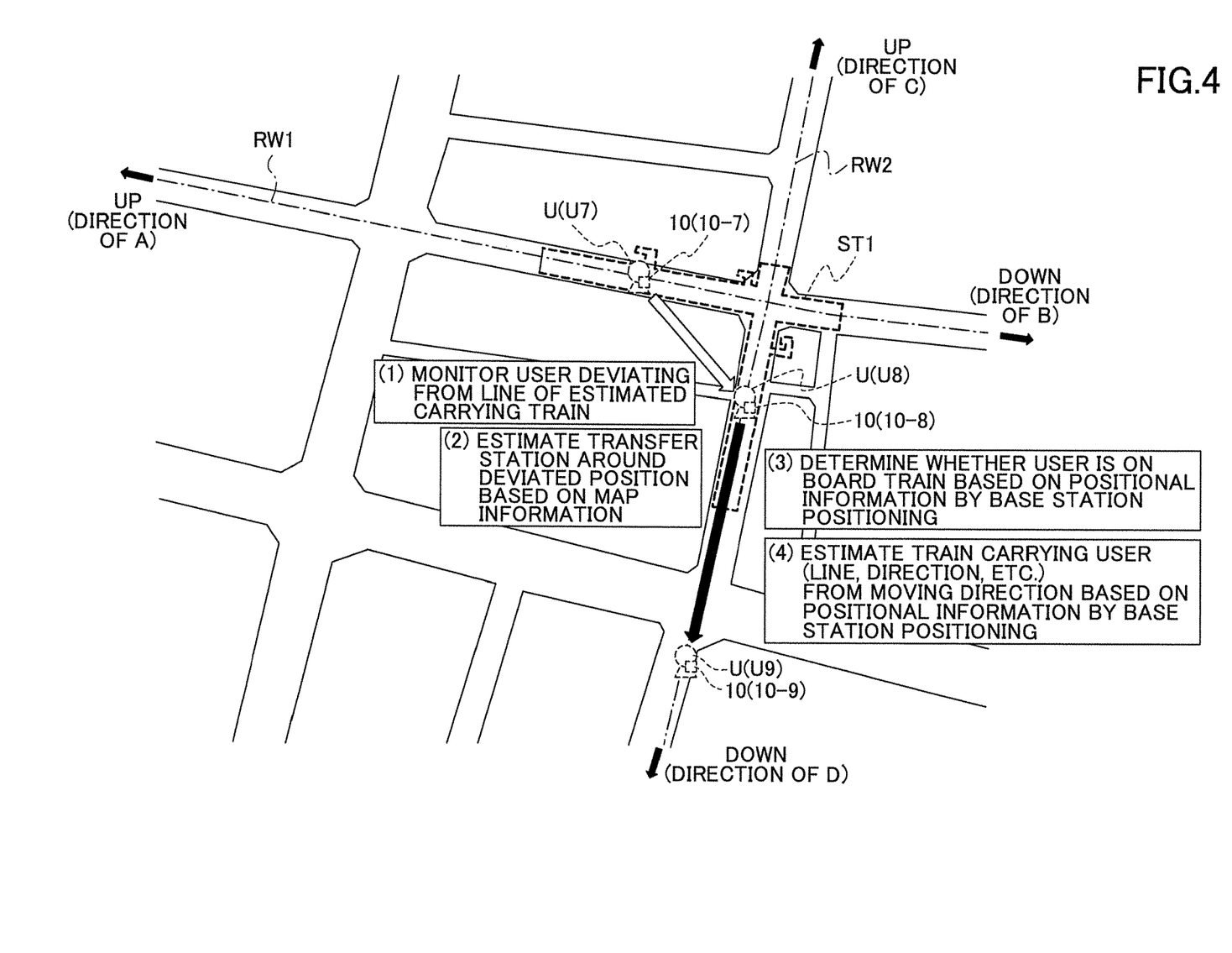
FIG. 4 is a diagram illustrating operations of a position estimation system.

First, FIG. 2 to FIG. 4 are diagrams illustrating operations of the position estimation system according to the embodiment, namely, the movement-by-train estimation function by the second position estimator 104. Specifically, FIG. 2 illustrates a situation where a user U of a mobile terminal 10 enters the premises of a station ST1 and boards a train of a line RW1 in a down direction (direction of B), and processing operations of the second position estimator 104 corresponding to the situation. Also, FIG. 3 illustrates a continuation of FIG. 2, specifically, a situation where the user U of the mobile terminal 10 who has boarded the down train of the line RW1 gets off at a station ST2 and comes out of the premises of the station ST2, and processing operations of the second position estimator 104 corresponding to the situation. Also, FIG. 4 illustrates a situation where the user U of the mobile terminal 10 changes trains at the station ST1 from a down train of the line RW1 to a train of a line RW2 in a down direction (direction of D), and processing operations of the second position estimator 104 corresponding to the situation.

Note that in FIG. 2 to FIG. 4, to clarify the movement situation of the user U and the mobile terminal 10 in time series, the user U and the mobile terminal 10 at different times will be distinguished by codes U1-U9 for the user and 10-1 to 10-9 for the mobile terminal. Also assume that the stations ST1 and ST2 are both located underground, and the mobile terminal 10 cannot receive a GPS signal well in the premises of the stations ST1 and ST2. Also, all of or a part of the sections of the lines RW1 and RW2 are located underground, which are, for example, subway lines. Also, the sections of the line RW1 from the station ST1 to the station ST2 are all located underground, and the mobile terminal 10 cannot receive a GPS signal well in a train that travels in the sections.

First, referring to FIG. 2, the user U1 on the ground where a GPS signal can be received well enters the premises of the station ST1 at an entrance E1, namely, goes underground (time t1). Since the mobile terminal 10-1 carried by the user U1 on the ground can receive a GPS signal well, the communication unit 11 of the mobile terminal 10-1 transmits the GPS positioning information to the center 100 at the time t1.

In contrast, since the mobile terminal 10-2 carried by the user U2 who has entered the premises of the station ST1 cannot receive a GPS signal well, the communication unit 11 of the mobile terminal 10-2 transmits the base station positioning information to the center 100 (time t2).

In this situation, the second position estimator 104 first obtains the positional information of the mobile terminal 10-1 at the time t1, namely, the positional information just before the mobile terminal 10 has become incapable of executing the GPS positioning. At this time, the second position estimator 104 may obtain the first estimated position of the mobile terminal 10-1 by the first position estimator 103, or may obtain the GPS positioning information at the time t1. Then, the second position estimator 104 estimates an entraining station (the station ST1) at which the user U2 carrying the mobile terminal 10-2 is located, based on the positional information of the mobile terminal 10 at the time t1, and the map information stored in the map information DB 110.

Once the user U2 carrying the mobile terminal 10-2 and located in the premises of the station ST1 has boarded a down train of the line RW1 and the train has departed, the mobile terminal 10-2 starts moving at a comparatively high moving speed (time t3). Then, the mobile terminal 10-3 of the user U3 is moving in the down direction of the line RW1 from the station ST1 along with the movement of the train (time t4).

In this situation, the second position estimator 104 determines whether the user has boarded the train, based on the base station positioning information of the mobile terminal 10 during the time t3 to t4. For example, the second position estimator 104 calculates the moving speed of the mobile terminal 10 from the base station positioning information of the mobile terminal 10 during the time t3 to t4; and if the moving speed is above a predetermined value enabling determination of traveling by train, the second position estimator 104 can determine that the user U2 carrying the mobile terminal 10-2 has boarded the train. This is because although the base station positioning has a comparatively lower precision as described above, a moving speed based on a difference in time series to a certain degree reflects the actual situation.

Also, the second position estimator 104 calculates the moving direction of the mobile terminal 10 from the base station positioning information of the mobile terminal 10 during the time t3 to t4, to estimate which train was boarded by the user (may be referred to as the "estimated boarded train", below) from the moving direction. Specifically, it is possible to estimate the line and the direction (up or down) of the train boarded by the user from the moving direction. This is because although the base station positioning has a comparatively lower precision as described above, a moving direction based on a difference in time series to a certain degree reflects the actual situation.

In this way, the second position estimator 104 determines whether a user of the mobile terminal 10 has boarded a train at a station, based on the base station positioning information if the mobile terminal 10 has become incapable of executing the GPS positioning in the vicinity of the station. Then, if having determined that the user has boarded a train at the station, the second position estimator 104 estimates which train was boarded by the user, based on the moving direction of the mobile terminal 10 calculated from the base station positioning information. Therefore, although the base station positioning information itself is of low precision, since the moving direction of the mobile terminal 10 calculated from the base station positioning information to a certain degree reflects the actual situation, it is possible to estimate which train was boarded by the user in terms of which line stops at the station and which direction of the line has been taken, based on the moving direction. Consequently, it is possible to raise precision of the estimated position of the mobile terminal 10 in a case where the user of the mobile terminal 10 is moving by train in a situation where the mobile terminal 10 cannot receive a GPS signal well.

Next, referring to FIG. 3, the user U4 carrying the mobile terminal 10-4 is on board the train and is moving on the line RW1 from the station ST1 to the station ST2.

In this situation, namely, the situation where the mobile terminal 10-4 continues to be in a state incapable of executing the GPS positioning, the second position estimator 104 monitors that the user U4 is on board the train (estimated boarded train), based on the base station positioning information by the mobile terminal 10-4, and the map information stored in the map information DB 110. In other words, the second position estimator 104 monitors the consistency between the moving direction of mobile terminal 10-4 calculated based on the base station positioning information by the mobile terminal 10-4, and the moving direction of the estimated boarded train on the line RW1, so as to be capable of determining whether the user U4 is on board the train.

When the train arrives at the station ST2, the user U5 carrying the mobile terminal 10-5 gets off the train (time t5).

Then, the user U5 carrying the mobile terminal 10-5 comes out of the premises of the station ST2 from an entrance E2 of the station ST2, namely, appears on the ground. Since the mobile terminal 10-6 carried by the user U6 who has appeared on the ground can receive a GPS signal well, the communication unit 11 of the mobile terminal 10-6 transmits the GPS positioning information to the center 100 (time t6).

In this situation, the second position estimator 104 estimates transportation means when the mobile terminal 10-6 becomes capable of executing the GPS positioning again, based on the base station positioning information by the mobile terminal 10-5 or the GPS positioning information by the mobile terminal 10-6. In other words, the second position estimator 104 determines whether a movement is on foot or by train. For example, the second position estimator 104 calculates the moving speed of the mobile terminal 10 based on the at least one of the base station positioning information by the mobile terminal 10-5 and the GPS positioning information by the mobile terminal 10-6, to determine whether a movement is on foot or by train, based on the moving speed. In the situation illustrated in FIG. 3, since the user has come out of the premises of the station ST2 on foot, the second position estimator 104 determines that the movement is on foot and estimates the station (the station ST2) based on the map information.

Note that a rail line may be constituted in part with sections underground and with the other sections above the ground. In such a case, if a train boarded by the user U carrying the mobile terminal 10 has traveled underground and comes out on the ground, the mobile terminal 10 transitions to a state capable of receiving a GPS signal again. Therefore, if having determined that a movement is by train, the second position estimator 104 can determine that the estimated boarded train that has been traveling underground comes out above the ground.

Next, referring to FIG. 4, the user U7 of the mobile terminal 10-7 who has boarded a down train of the line RW1 gets off at the station ST1, moves in the premises of the station ST1, and moves to a platform of the line RW2 (time t7).

In this situation, as described above, the second position estimator 104 monitors that the user is on board the train (estimated boarded train), based on the base station positioning information by the mobile terminal 10 and the map information stored in the map information DB 110. In the situation illustrated in FIG. 4, the user U7 moves in the premises of the station S1, and arrives at the platform of the line RW2 having a moving direction obviously different from that of the line RW1. Therefore, during the course of the movement, the second position estimator 104 can determine that the moving direction of the mobile terminal 10-7 calculated based on the base station positioning information by the mobile terminal 10-7 has deviated from the moving direction of the estimated boarded train on the line RW1. In other words, the second position estimator 104 can determine that there is a likelihood that the user U7 is moving for a transfer.

Also, the second position estimator 104 estimates a station around the deviation point at which a transfer can be made (a possible transfer station), based on the map information stored in the map information DB 110 and the like. Since the station ST1 is a stop station of the estimated boarded train where the multiple lines RW1 and RW2 cross, the second position estimator 104 estimates the station ST1 as a possible transfer station.

When a train arrives at the platform of the line RW2 in the station ST1, to which the user U8 carrying the mobile terminal 10-8 has moved, the user U8 boards the train that goes in the down direction of the line RW2; then, once the train has departed, the mobile terminal 10-8 starts moving at a comparatively high moving speed (time t8). Then, the mobile terminal 10-9 of the user U9 is moving in the down direction of the line RW2 from the station ST1 along with the movement of the train (time t9).

In this situation, the second position estimator 104 determines whether the user has boarded a transfer train, based on the base station positioning information of the mobile terminal 10 during the time t8 to t9. For example, the second position estimator 104 calculates the moving speed of the mobile terminal 10 from the base station positioning information of the mobile terminal 10 during the time t8 to t9; and if the moving speed is above a predetermined value enabling determination of traveling by train, the second position estimator 104 can determine that the user U9 carrying the mobile terminal 10-9 has boarded a transfer train. This is because although the base station positioning has a comparatively lower precision as described above, a moving speed based on a difference in time series to a certain degree reflects the actual situation.

Also, the second position estimator 104 calculates the moving direction of the mobile terminal 10 from the base station positioning information of the mobile terminal 10 during the time t8 to t9, to estimate which train was boarded by the user (may be referred to as the "estimated transfer train", below) from the moving direction. Specifically, it is possible to estimate the line and the direction (up or down) of the train boarded by the user from the moving direction. This is because although the base station positioning has a comparatively lower precision as described above, a moving direction based on a difference in time series to a certain degree reflects the actual situation.

In this way, in a situation where the mobile terminal 10 continues to be in a state incapable of executing the GPS positioning, in the vicinity of a stop station of the estimated boarded train, the second position estimator 104 determines whether the user of the mobile terminal 10 has changed trains at the station, based on the base station positioning information, if the moving direction of the mobile terminal 10 calculated from the base station positioning information deviates from the moving direction of the estimated boarded train beyond a predetermined criterion. Then, if having determined that the user has changed trains, the second position estimator 104 estimates which train was boarded by the user after the change (estimated transfer train), based on the moving direction of the mobile terminal 10 calculated from the base station positioning information. Therefore, even if the user changes trains at a stop station of a previous train boarded by the user, it is possible to estimate the train after the change in terms of which line stops at the station and which direction of the line has been taken, based on the moving direction of the mobile terminal 10 calculated from the base station positioning information. Therefore, it is possible to further raise the precision of the estimated position of the mobile terminal 10 in a case where the user of the mobile terminal 10 is moving in a situation where the mobile terminal 10 cannot receive a GPS signal well.

Next, with reference to FIG. 5 and FIG. 6, a processing flow relevant to the movement-by-train estimation function in the position estimation system 1 will be described.

Figure 5:
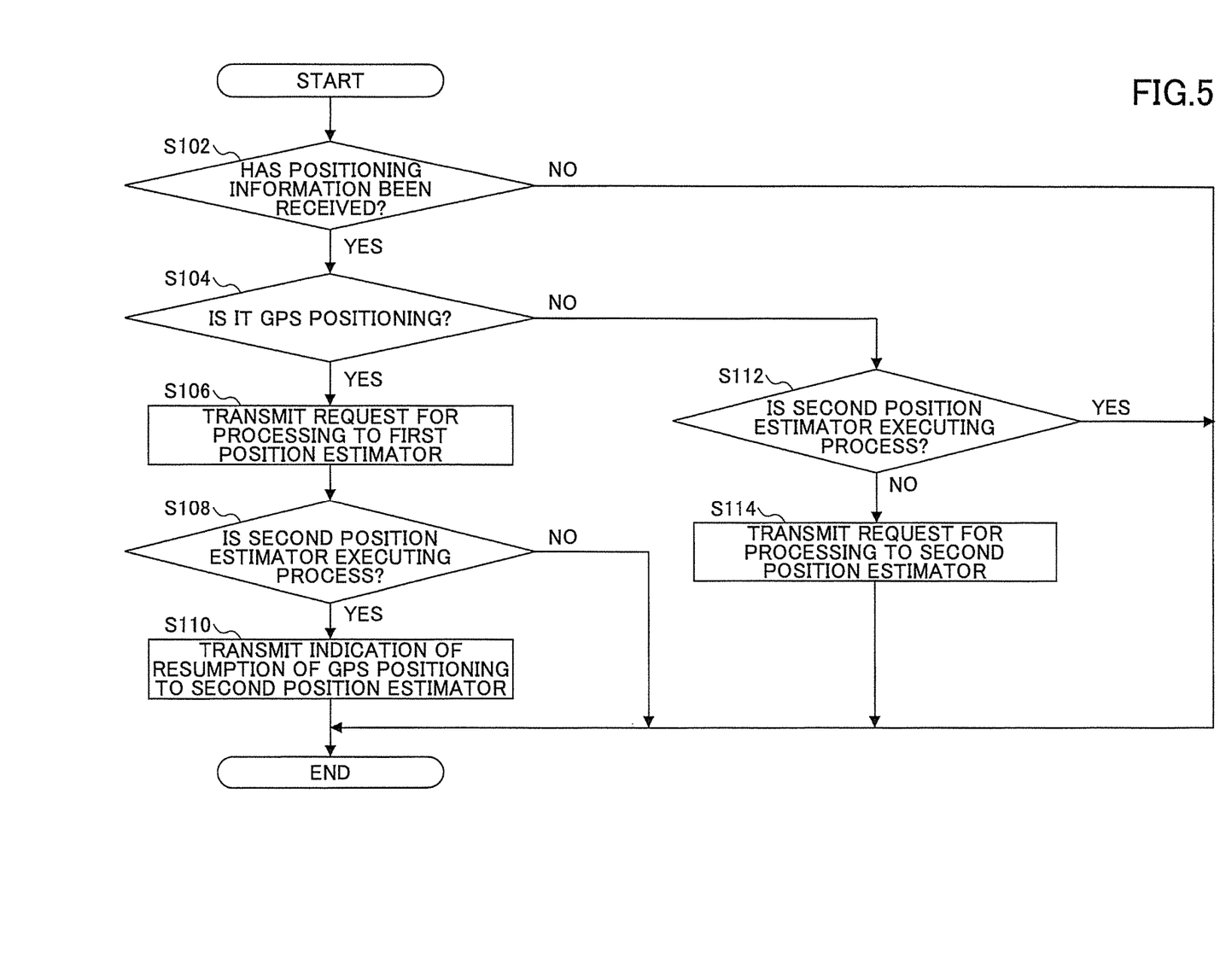
FIG. 5 is a flowchart schematically illustrating an example of a process by a movement analyzer.

First, FIG. 5 is a flowchart schematically illustrating an example of a process by the movement analyzer 102. A process according to this flowchart is executed, for example, every time an indication of a determination result, which indicates whether the periodical positioning executed by the mobile terminal 10 is the GPS positioning or the base station positioning, is received from the communication unit 101.

Referring to FIG. 5, at Step S102, the movement analyzer 102 determines whether the communication unit 101 has received positioning information (one of the GPS positioning information and the base station positioning information) from the mobile terminal 10. If the communication unit 101 has received positioning information from the mobile terminal 10, the movement analyzer 102 proceeds to Step S104; or if not received, namely, if the mobile terminal 10 is located outside of an area where communication is possible, the movement analyzer 102 ends the current process.

At Step S104, the movement analyzer 102 determines whether the determination result received from the communication unit 101 is "GPS positioning". If the determination result is "GPS positioning", namely, if the communication unit 101 has received GPS positioning information, the movement analyzer 102 proceeds to Step S106; or if the determination result is "base station positioning", namely, if the communication unit 101 has received base station positioning information, the movement analyzer 102 proceeds to Step S112.

At Step S106, the movement analyzer 102 transmits a request for processing to the first position estimator 103.

At Step S108, the movement analyzer 102 determines whether a position estimation process is being executed by the second position estimator 104. If a position estimation process is being executed by the second position estimator 104, the movement analyzer 102 proceeds to Step S110; or if not being executed, ends the current process.

At Step S110, the movement analyzer 102 transmits an indication of resumption of the GPS positioning to the second position estimator 104, and ends the current process.

On the other hand, if having determined at Step S104 that the determination result is "base station positioning", the movement analyzer 102 determines whether a position estimation process is being executed by the second position estimator 104 at Step S112. If a position estimation process is not being executed by the second position estimator 104, the movement analyzer 102 proceeds to Step S114; or if being executed, ends the current process.

At Step S114, the movement analyzer 102 transmits a request for processing to the second position estimator 104, and ends the current process.

Figure 6:
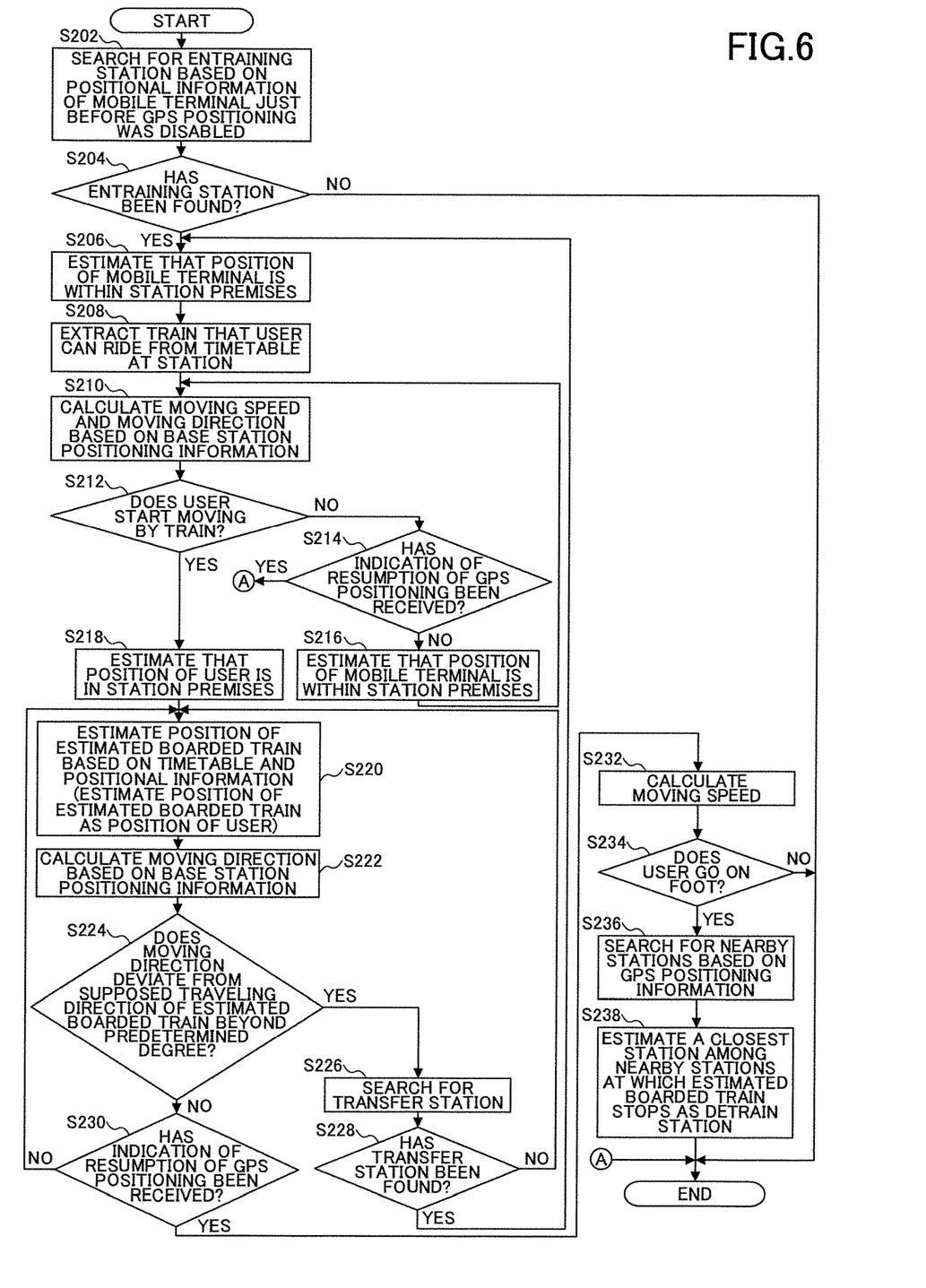
FIG. 6 is a flowchart schematically illustrating an example of a process by a second position estimator.

Next, FIG. 6 is a flowchart schematically illustrating an example of a process by the second position estimator 104. A process according to this flowchart is started when a request for processing has been received from the movement analyzer 102.

Referring to FIG. 6, at Step S202, the second position estimator 104 searches for an entraining station from the positional information of the mobile terminal 10 just before becoming incapable of executing the GPS positioning, and the map information stored in the map information DB 110. In other words, the second position estimator 104 searches for an entraining station in the vicinity of the position of the mobile terminal 10 just before becoming incapable of executing the GPS positioning.

Note that as described above, the positional information of the mobile terminal 10 just before becoming incapable of executing the GPS positioning may be a first estimated position by the first position estimator 103, or the GPS positioning information as is.

At Step S204, the second position estimator 104 determines whether an entraining station has been found, namely, whether the mobile terminal 10 has become incapable of executing the GPS positioning in the vicinity of the station. If an entraining station has been found, the second position estimator 104 proceeds to Step S206; or if not found, ends the current process.

At Step S206, the second position estimator 104 estimates the premises of the found entraining station as the position of the mobile terminal 10, and transmits the second estimated position to the movement analyzer 102.

At Step S208, the second position estimator 104 extracts trains that can be boarded based on the timetable information stored in the timetable information DB 111. The second position estimator 104 extracts at least one train in each direction (up and down) for each line. In this case, the second position estimator 104 may extract trains that can be boarded in consideration of the scale of the entraining station, which affects transit time or the like required for arriving at a platform of a line after having entered the premises.

At Step S210, the second position estimator 104 calculates the moving speed and moving direction of the mobile terminal 10, based on (the latest history of) the base station positioning information received by the communication unit 101.

At Step S212, the second position estimator 104 determines whether the user of the mobile terminal 10 has boarded a train, namely, has started moving by train. If having determined that the user has not boarded a train, the second position estimator 104 proceeds to Step S214; or if having determined that the user has boarded a train, proceeds to S218.

At Step S214, the second position estimator 104 determines whether an indication of resumption of the GPS positioning has been received from the movement analyzer 102. If an indication of resumption of the GPS positioning has not been received, the second position estimator 104 proceeds to Step S216; or if received, ends the current process.

At Step S216, the second position estimator 104 estimates the premises of the entraining station as the position of the mobile terminal 10, transmits the second estimated position to the movement analyzer 102, and returns to Step S210 to repeat Steps S210 and S212.

On the other hand, if having determined at Step S212 that the user has boarded a train, at Step S218, the second position estimator 104 estimates the train that has been boarded (estimated boarded train) among the trains that can be boarded, based on the calculated moving direction of the mobile terminal 10.

At Step S220, the second position estimator 104 estimates the position of the estimated boarded train, based on the timetable information stored in the timetable information DB 111, the map information stored in the map information DB 110, and the like. For example, the second position estimator 104 estimates the position of the estimated boarded train, based on the arrival and departure times at each stop station of the estimated boarded train included in timetable information. Then, the second position estimator 104 estimates the position of the estimated boarded train as the position of the mobile terminal 10, and transmits the second estimated position to the movement analyzer 102.

At Step S222, the second position estimator 104 calculates the moving direction of the mobile terminal 10, based on (the latest history of) the base station positioning information received by the communication unit 101.

At Step S224, the second position estimator 104 determines whether the calculated moving direction of the mobile terminal 10 deviates from the moving direction of the estimated boarded train beyond a predetermined criterion, based on the map information stored in the map information DB 110. If the determination condition is satisfied, the second position estimator 104 proceeds to Step S226; or if the determination condition is not satisfied, proceeds to Step S230.

At Step S226, the second position estimator 104 searches for a transfer station, based on the base station positioning information received by the communication unit 101, the map information stored in the map information DB 110, and the like. In other words, the second position estimator 104 searches for a station at which the estimated boarded train stops, and a transfer is possible to another line (estimated transfer station) in the vicinity of the point where the moving direction of the mobile terminal 10 deviates from the moving direction of the estimated boarded train.

At Step S228, the second position estimator 104 determines whether an estimated transfer station has been found. If an estimated transfer station has been found, the second position estimator 104 returns to Step S206; or if the estimated transfer station has not been found, returns to Step S220.

On the other hand, if having determined at Step S224 that the moving direction of the mobile terminal 10 does not deviate from the moving direction of the estimated boarded train, at Step S230, the second position estimator 104 determines whether an indication of resumption of the GPS positioning has been received from the movement analyzer 102. If an indication of resumption of the GPS positioning has not been received, the second position estimator 104 returns to Step S220; or if received, proceeds to Step S232.

At Step S232, the second position estimator 104 calculates the moving speed of the mobile terminal 10, based on at least one of the GPS positioning information and the base station positioning information received by the communication unit 101. Specifically, the second position estimator 104 calculates the moving speed of the mobile terminal 10, based on at least one of the GPS positioning information just before or after the mobile terminal 10 has become capable of executing the GPS positioning again, and the base station positioning information.

At Step S234, the second position estimator 104 determines whether transportation means of the user carrying the mobile terminal 10 is a movement on foot, based on the calculated moving speed of the mobile terminal 10. If the transportation means of the user carrying the mobile terminal 10 is a movement on foot, the second position estimator 104 proceeds to Step S236; or if a movement is not on foot but by train, ends the current process.

Note that the second position estimator 104 may transfer to the first position estimator 103 the information about the estimated boarded train and the estimated transfer train in the case of a movement by train. Accordingly, the first position estimator 103 can track the estimated boarded train traveling above the ground, based on the GPS positioning information, while referring to the process result of the second position estimator 104.

At Step S236, the second position estimator 104 searches for stations in the vicinity of the mobile terminal 10, based on the GPS positioning information received by the communication unit 101, the map information stored in the map information DB 110, and the like.

At Step S238, the second position estimator 104 estimates the nearest station as the detrain station among the nearby stations at which the estimated boarded train or the estimated transfer train stops, transmits the information related to the detrain station to the movement analyzer 102, and ends the current process.

In this way, in the embodiment, if the mobile terminal 10 has become incapable of executing the GPS positioning in the vicinity of a station, the second position estimator 104 determines whether the user of the mobile terminal 10 has boarded a train at the station, based on the base station positioning information. Then, if having determined that the user has boarded a train at the station, the second position estimator 104 estimates which train was boarded by the user, based on the moving direction of the mobile terminal 10 calculated from the base station positioning information. Therefore, although the base station positioning is of comparatively low precision, since a moving direction of the mobile terminal calculated from the base station positioning information (specifically, a difference in the history of the base station positioning information) to a certain degree reflects the actual situation, it is possible to estimate which train was boarded by the user in terms of which line stops at the station and which direction of the line has been taken, based on the moving direction. Therefore, it is possible to raise precision of the estimated position of the user who is moving in a situation where the mobile terminal 10 cannot receive a GPS signal.

Also, the second position estimator 104 estimates which train was boarded by the user, based on the moving direction of the mobile terminal 10 calculated from the base station positioning information and timetable information. Therefore, with reference to departure times of trains in the timetable information, it is possible to estimate which train was boarded by the user in terms of the departure time by hours and minutes. Therefore, it is possible to further raise the precision of the estimated position of the user who is moving in a situation where the mobile terminal 10 cannot receive a GPS signal.

Also, while the mobile terminal 10 continues to be in a state incapable of executing the GPS positioning and the determination continues to be valid with respect to the user being on board the estimated boarded train, the second position estimator 104 estimates the position of the mobile terminal 10, based on the arrival and departure times at each stop station of the train included in the timetable information. Therefore, even in a situation where the mobile terminal 10 cannot receive a GPS signal, and the user carrying the mobile terminal 10 is moving by train, based on the arrival and departure times at each stop station in the timetable information, it is possible to estimate the position of the mobile terminal 10 at the times with comparatively good precision. Therefore, it is possible to further raise the precision of the estimated position of the user who is moving in a situation where the mobile terminal 10 cannot receive a GPS signal.

Also, in a situation where the mobile terminal 10 continues to be in a state incapable of executing the GPS positioning, in the vicinity of a stop station of the estimated boarded train, the second position estimator 104 determines whether the user has changed trains at the station, based on the base station positioning information, if the moving direction of the mobile terminal 10 calculated from the base station positioning information deviates from the moving direction of the estimated boarded train beyond a predetermined criterion. Then, if it has been determined that the user has changed trains at the stop station, the center 100 estimates which train was boarded by the user after the change, based on the moving direction of the mobile terminal 10 calculated from the base station positioning information. Therefore, even if the user boards a train (a transfer train) at the stop station after having boarded and gotten off an estimated boarded train, it is possible to estimate the transfer train in terms of which line stops at the station and which direction of the line has been taken, based on the moving direction of the mobile terminal 10 calculated from the base station positioning information. Therefore, it is possible to further raise the precision of the estimated position of the user who is moving in a situation where the mobile terminal 10 cannot receive a GPS signal.

As above, the embodiments of the present disclosure have been described in detail. Note that the present disclosure is not limited to the above specific embodiments, but various modifications and changes can be made within the scope of the present disclosure described by the claims.

The invention claimed is:

1. A position estimation system, comprising:
   a mobile terminal; and
   a center configured to communicate with the mobile terminal through a predetermined communication network,
   wherein the mobile terminal includes:
      a GPS positioning unit configured to execute GPS positioning,
      a base station positioning unit configured to execute base station positioning,
      a first transmitter configured to transmit first positional information obtained by the GPS positioning to the center, and
      a second transmitter configured to transmit second positional information obtained by the base station positioning to the center,
   wherein the center includes:
      a storage unit configured to store timetable information,
      a receiver configured to receive the first positional information and the second positional information transmitted from the mobile terminal, and
      a position estimator configured to calculate a moving speed of the mobile terminal based on the second positional information when the mobile terminal has become incapable of executing the GPS positioning in a vicinity of a station, and determine whether a user of the mobile terminal has boarded a train at the station based on whether the moving speed of the mobile terminal is above a predetermined value, and when it is determined that the user has boarded the train at the station based on the moving speed of the mobile terminal being above the predetermined value, to estimate which train was boarded by the user, based on a moving direction of the mobile terminal calculated from the second positional information,
   wherein the position estimator:
      determines whether the user is on board the train boarded by the user, based on the second positional information and the moving speed of the mobile terminal,
      estimates a position of the mobile terminal, based on arrival and departure times at each stop station of the train boarded by the user included in the timetable information, while the mobile terminal continues to be in a state incapable of executing the GPS positioning and the determination continues to be valid with respect to the user being on board the train boarded by the user,
      in a situation where the mobile terminal continues to be in a state incapable of executing the GPS positioning, determines whether the user has changed trains at a stop station of the train boarded by the user, based on the second positional information, when the moving direction of the mobile terminal calculated from the second positional information deviates from a moving direction of the train boarded by the user beyond a predetermined criterion in a vicinity of the stop station of the train boarded by the user, and when it is determined that the user has changed the trains, estimates the train after the change, based on the moving direction of the mobile terminal calculated from the second positional information.

2. A center that communicates with a mobile terminal, including a GPS positioning unit configured to execute GPS positioning and a base station positioning unit configured to execute base station positioning, the center comprising:

a receiver configured to receive first positional information obtained by the GPS positioning and second positional information obtained by the base station positioning from the mobile terminal; and a position estimator configured to calculate a moving speed of the mobile terminal based on the second positional information when the mobile terminal has become incapable of executing the GPS positioning in a vicinity of a station, to determine whether a user of the mobile terminal has boarded a train at the station based on whether the moving speed of the mobile terminal is above a predetermined value, and when it is determined that the user has boarded the train at the station, to estimate which train was boarded by the user, based on a moving direction of the mobile terminal calculated from the second positional information, wherein the position estimator:

determines whether the user is on board the train boarded by the user, based on the second positional information and the moving speed of the mobile terminal, and estimates a position of the mobile terminal, based on arrival and departure times at each stop station of the train boarded by the user included in timetable information stored in a storage unit of the center, while the mobile terminal continues to be in a state incapable of executing the GPS positioning and the determination continues to be valid with respect to the user being on board the train boarded by the user, in a situation where the mobile terminal continues to be in a state incapable of executing the GPS positioning, determines whether the user has changed trains at a stop station of the train boarded by the user, based on the second positional information and the moving speed of the mobile terminal, when the moving direction of the mobile terminal calculated from the second positional information deviates from a moving direction of the train boarded by the user beyond a predetermined criterion in a vicinity of the stop station of the train boarded by the user, and when it is determined that the user has changed the trains, estimates the train after the change, based on the moving direction of the mobile terminal calculated from the second positional information.

3. A position estimation system, comprising:

a mobile terminal; and a center configured to communicate with the mobile terminal through a predetermined communication network, wherein the mobile terminal includes:

a GPS positioning unit configured to execute GPS positioning, a base station positioning unit configured to execute base station positioning, a first transmitter configured to transmit first positional information obtained by the GPS positioning to the center, and a second transmitter configured to transmit second positional information obtained by the base station positioning to the center, wherein the center includes:

a storage unit configured to store timetable information;

a receiver configured to receive the first positional information and the second positional information transmitted from the mobile terminal, and a position estimator configured to determine whether the mobile terminal is capable of executing the GPS positioning, and upon determination that the mobile terminal is incapable of executing the GPS positioning, the position estimator is configured to determine whether a user of the mobile terminal has boarded a train at a station based on the second positional information and the first positional information just prior to being incapable of executing the GPS positioning and based on whether a moving speed of the mobile terminal calculated by the position estimator is above a predetermined value, and when it is determined that the user has boarded a train at the station, the position estimator is configured to estimate which train was boarded by the user, based on a moving direction of the mobile terminal calculated from the second positional information and the timetable information from the storage unit, wherein the position estimator;

determines whether the user is on board the train boarded by the user, based on the second positional information and the moving speed of the mobile terminal, and estimates a position of the mobile terminal, based on arrival and departure times at each stop station of the train boarded by the user included in the timetable information, while the mobile terminal continues to be in a state incapable of executing the GPS positioning and the determination continues to be valid with respect to the user being on board the train boarded by the user, in a situation where the mobile terminal continues to be in a state incapable of executing the GPS positioning, determines whether the user has changed trains at a stop station of the train boarded by the user, based on the second positional information and the moving speed of the mobile terminal, when the moving direction of the mobile terminal calculated from the second positional information deviates from a moving direction of the train boarded by the user beyond a predetermined criterion in a vicinity of the stop station of the train boarded by the user, and when it is determined that the user has changed the trains, estimates the train after the change, based on the moving direction of the mobile terminal calculated from the second positional information and the moving speed of the mobile terminal.

* * * * *

UNITED STATES PATENT AND TRADEMARK OFFICE
CERTIFICATE OF CORRECTION

PATENT NO. : 10,613,190 B2
APPLICATION NO. : 15/631666
DATED : April 7, 2020
INVENTOR(S) : Koichi Suzuki It is certified that error appears in the above-identified patent and that said Letters Patent is hereby corrected as shown below:

On the Title Page

Item (72), inventor city, delete "Miyoshi" and insert --Miyoshi-shi Aichi-ken--, therefor.

Signed and Sealed this
Twenty-sixth Day of May, 2020

Andrei Iancu
*Director of the United States Patent and Trademark Office*